United States Patent
Nakatsu et al.

[11] Patent Number: 6,005,507
[45] Date of Patent: Dec. 21, 1999

[54] DATA DECODING APPARATUS

[75] Inventors: Etsuto Nakatsu, Hirakata; Atsuo Ochi, Moriguchi; Hirofumi Nakagaki, Kadoma; Naoshi Usuki, Yawata, all of Japan

[73] Assignee: Matsushita Electric Industrial Co., Ltd., Osaka, Japan

[21] Appl. No.: 09/023,384

[22] Filed: Feb. 13, 1998

[30] Foreign Application Priority Data

Feb. 17, 1997 [JP] Japan .................................. 9-031826

[51] Int. Cl.⁶ ......................................................... H03M 1/12
[52] U.S. Cl. ............................................ 341/155; 341/111
[58] Field of Search .................................. 341/155, 110, 341/163, 159

[56] References Cited

U.S. PATENT DOCUMENTS

| | | |
|---|---|---|
| 5,287,025 | 2/1994 | Nishimichi . |
| 5,808,573 | 9/1998 | Shih et al. ............................. 341/110 |

FOREIGN PATENT DOCUMENTS

| | | |
|---|---|---|
| 6-1191122 | 8/1986 | Japan . |
| 2-311022 | 12/1990 | Japan . |
| 6-180949 | 6/1994 | Japan . |
| 7-192404 | 7/1995 | Japan . |
| 8-329620 | 12/1996 | Japan . |

OTHER PUBLICATIONS

European Search Report for EP 98 30 1101 dated Mar. 9, 1999.

F. Dolivo et al., "Fast Timing Recovery for Partial–Response Signaling Systems", IEEE International Conference on Communications, BOSTONICC/89, Jun. 1989, pp. 18.5.1–18.5.5.

Primary Examiner—B. K Young
Attorney, Agent, or Firm—Ratner & Prestia

[57] ABSTRACT

A reproduced signal from a recording medium 1 is equalized at partial response (1, 0, −1) by a reproducing equalizer 3, and is converted into a reproduced and equalized signal. A clock reproducing circuit 4 issues a reproduced clock synchronized with the timing of data identification, and applies it to a phase adjusting circuit 5. A phase control signal generating circuit 6A detects a specific pattern from a reproduced digital signal issued from an A/D converter 7, and the advance or delay amount of phase of the reproduced clock is detected by the amplitude or distribution of the sampling value. This phase deviation amount is given to the phase adjusting circuit 5 as a phase control signal. The phase adjusting circuit 5 given a delayed clock to the A/D converter 7, and controls to A/D convert the reproduced signal at correct timing.

31 Claims, 10 Drawing Sheets

FIG. 1   PRIOR ART

FIG. 2A
Ternary signal PR (1,0,-1) detection

FIG. 2B
Binary signal integral detection

DATA DECODING APPARATUS

BACKGROUND OF THE INVENTION

The present invention relates to a data decoding apparatus for reproducing signals from a recording medium such as a magnetic tape, and obtaining video data or audio data.

As means for recording a data row into a magnetic recording medium, and reproducing the recorded signals and decoding into a same data row as before recording, a partial response system (hereinafter called PR) has been known. This is intended to equalize the reproduced signals to have an intersymbol interference, and identify the data row before recording from the signal corresponding to the multilevel. Hereinafter, a data decoding method employing PR (1, 0, −1) of which frequency characteristic is close to the magnetic recording system, as a kind of partial response, is described below.

Figure 1:
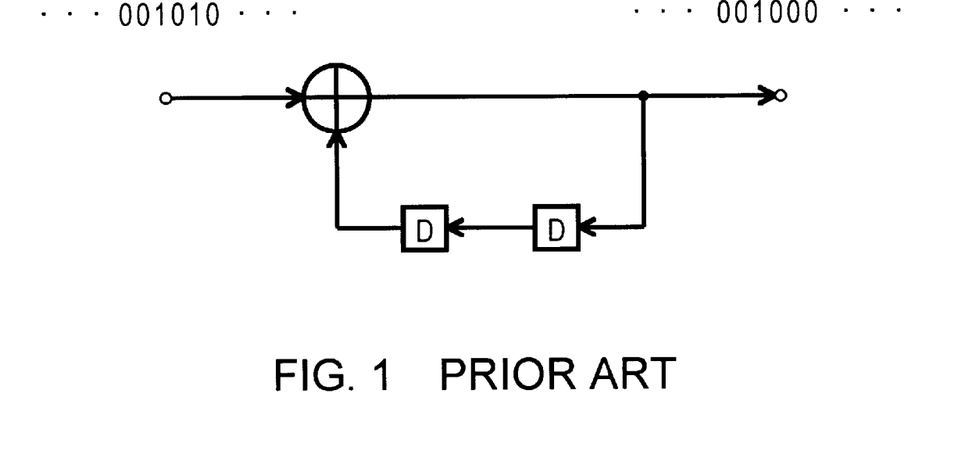
FIG. 1 is a structural diagram of a precoder for processing precoding before recording in PR (1, 0, −1).

In a magnetic recording medium, a data row after precoder shown in FIG. 1 is recorded. For example, an input data row . . . 001010 . . . is converted into . . . 001000. . . by the precoder, and recorded. Supposing D to be a delay operation of bit period, the reproduced signal from the magnetic recording medium is reproduced and equalized so that the frequency characteristic through recording and reproducing may be $1-D^2$, that is, the level subtracting the signal level of two bits before from the present signal level. It means that the reproduced signal from the magnetic recording medium in which the impulse . . . 001000 . . . may be equalized to . . . 0010−10 . . . .

Figure 2A:
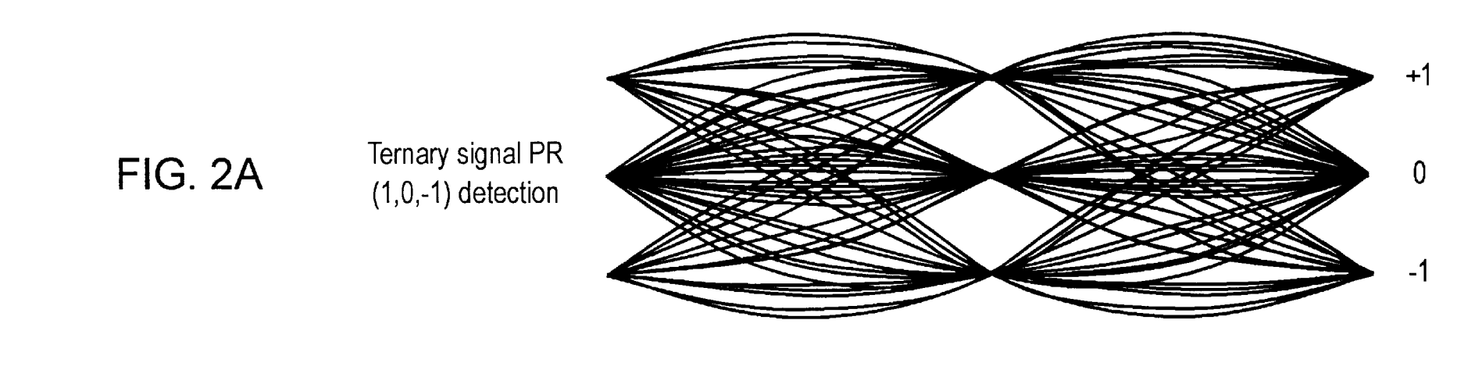
FIGS. 2A and 2B show an explanatory diagram for explaining the difference between the eye-pattern of ternary signal by PR (1, 0, −1) equalizing, and the eye-pattern of binary signal by integral equalizing.

The signal after being reproduced and equalized is as shown in the eye-pattern in FIG. 2A, in which the reference signal level at the data identification timing is a signal corresponding to three values of −1, 0 and +1. By identifying the signal level corresponding to +1 or −1 to be data "1" and the one corresponding to level 0 to be data "0," the original data row is decoded. Data decoding by partial response is briefly described herein, and the detail is narrated in the reference (Eto, Mita, Doi: Digital video recording technology, Nikkan Kogyo Shimbunsha, pp. 36–38, pp. 46–48).

Figure 2B:
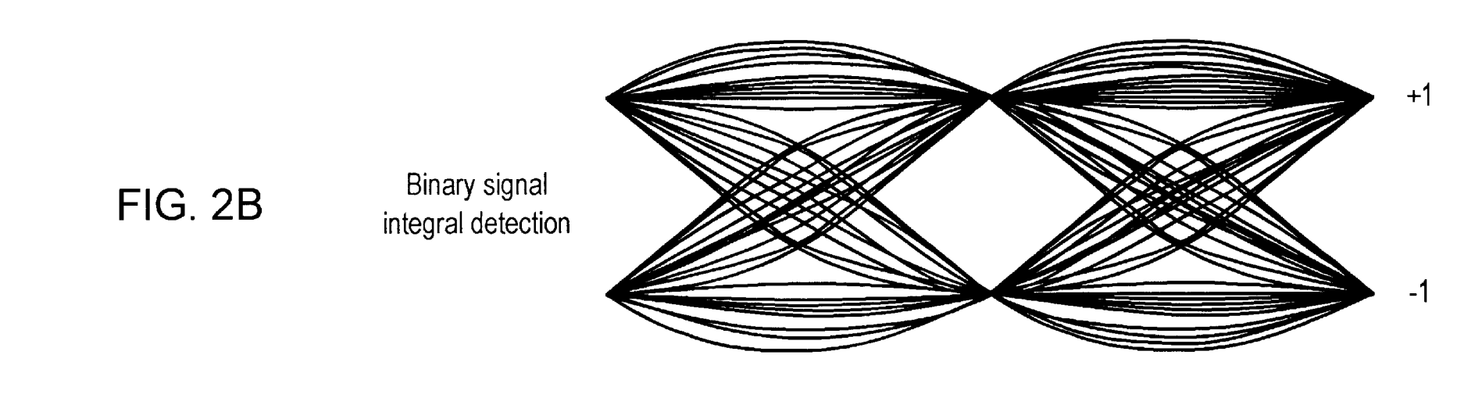

As shown in FIG. 2A, the opening width of the eye-pattern in the time axis direction in the partial response system is narrower than in the conventional integral detecting method shown in FIG. 2B. Accordingly, due to the effects of the temperature characteristic of the clock reproducing section, if the clock phase showing the detection timing is deviated, the error rate deteriorates significantly. Accordingly, in order to control so that the detection timing may be stably positioned in the center of the opening of the eye-pattern (hereinafter called the eye center), a magnetic recording apparatus is proposed in Japanese Laid-open Patent No. 7-192404. This is intended to detect the phase deviation of the clock from the specific pattern contained in the reproduced digital signal, and control by feedback.

However, the pull-in time of the clock phase of the specific pattern is proportional to the frequency of the specific pattern contained in the reproduced digital signal. Accordingly, in such magnetic recording apparatus, the frequency of occurrence of the specific pattern is enhanced, and the recorded signal is processed by encoding, so that the pull-in time of the clock phase is shortened. In this case, the ratio of the effective data contained in the recorded data is lowered.

Without encoding process for enhancing the frequency of occurrence of the specific pattern, the ratio of the effective data is not lowered, but the pull-in time of the clock phase is extended. As a result, it causes to prolong the reset time to restore the favorable error rate in the discontinuous portion of reproduced signal, such as the head changeover section in the digital VTR or drop-out section derived from the flaw on the recording medium. It is also possible that the specific pattern does not occur for a long period, and the clock phase is deviated in that period, and the error rate deteriorates.

Figure 6:
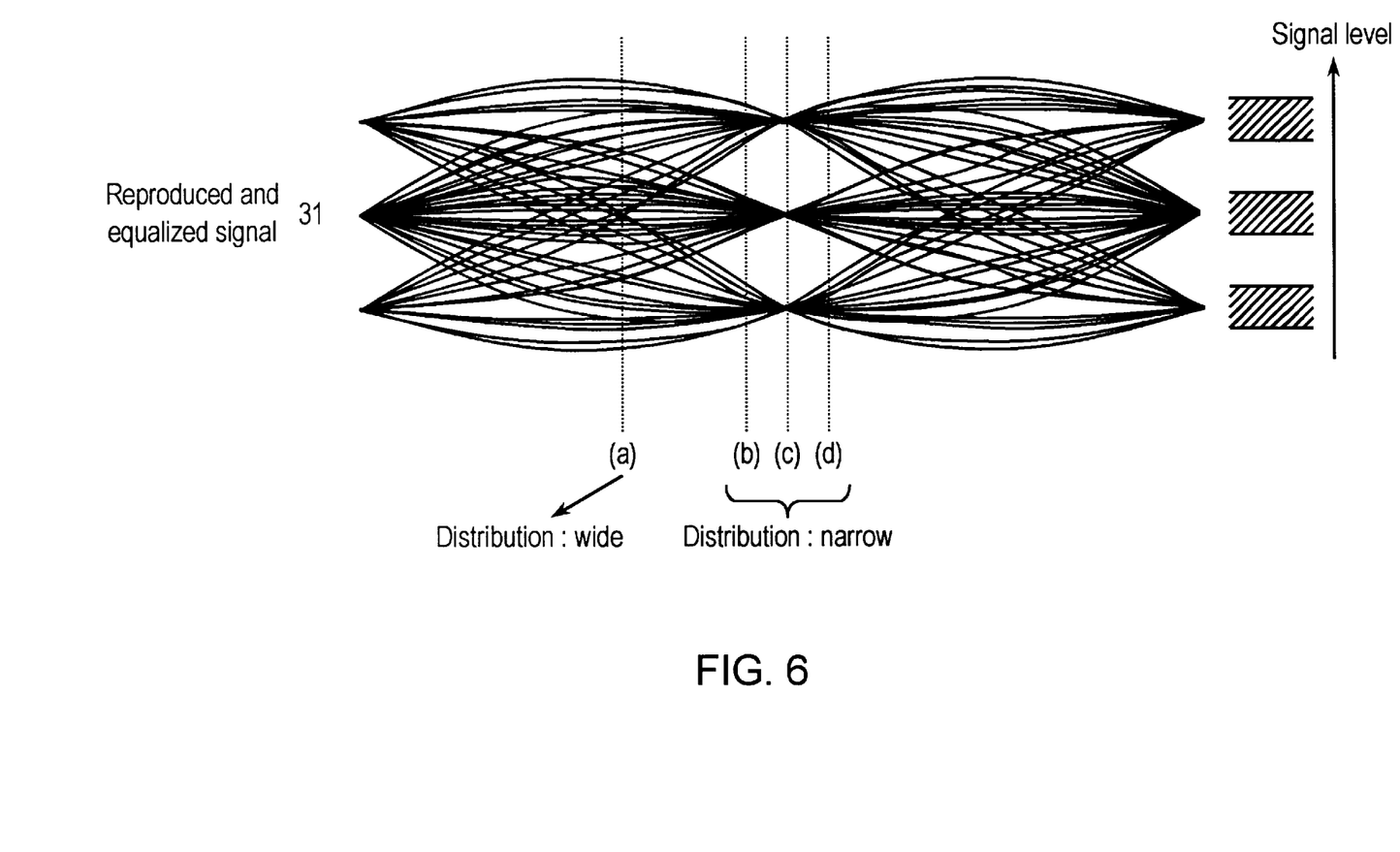
FIG. 6 is an explanatory diagram showing the relation between detection timing and distribution of reproduced and equalized signal in the eye-pattern.

FIG. 6 is an explanatory diagram showing the relation between the detection timing and the distribution of reproduced and equalized signal in the eyepattern. When the initial clock phase is largely deviated from the eye center at time indicated by broken line (a) in FIG. 6, the clock phase may not be pulled into the eye center, and if pulled in, it takes a considerably long time.

The invention is devised to improve the problems of such prior art, and it is hence an object thereof to realize a data decoding apparatus capable of adjusting automatically so that the detection timing of reproduced clock may always come to the eye enter, and obtaining data of low error rate always stably, and not requiring redundancy of recorded data.

SUMMARY OF THE INVENTION

To solve the above problems, the invention as set forth in claim 1 comprises a reproducing and equalizing circuit for converting a reproduced signal from a recording medium into a reproduced and equalized signal by equalizing according to partial response characteristic, a clock reproducing circuit for issuing a reproduced clock synchronized with the timing of data identification from the reproduced and equalized signal of the reproducing and equalizing circuit, a phase adjusting circuit for shifting the phase of the reproduced clock of the clock reproducing circuit depending on a phase control signal, and issuing it as a delayed clock, an A/D converter for sampling the reproduced and equalized signal by the delayed clock of the phase adjusting circuit and converting into a reproduced digital signal, a phase control signal generating circuit for detecting the clock phase deviation on the basis of the level change of the reproduced digital signal issued from the A/D converter, and issuing a phase control signal for decreasing the clock phase deviation against the phase adjusting circuit, and a decoder for decoding the reproduced digital signal of the A/D converter into data.

In the invention as set forth in claim 2, the phase control signal generating circuit comprises a phase deviation detecting circuit for extracting a code row symmetric back and forth in signal level at the turning point of a specific timing, as a specific pattern code, out of the reproduced digital signal of the A/D converter, and detecting a clock phase deviation on the basis of the level change of the specific pattern code, and a control signal converting circuit for issuing a phase control signal to the phase adjusting circuit so as to decrease the phase deviation detected in the phase deviation detecting circuit.

In the invention as set forth in claim 3, the phase control signal generating circuit comprises a distribution width judging circuit for calculating the distribution of the digital reproduced signal issued from the A/D converter from the reference signal level, and judging whether the level distribution is narrow or wide, a phase deviation detecting circuit for extracting a code row partially changing in signal level in a sinusoidal wave profile as a specific pattern code, out of the reproduced digital signal from the A/D converter, and detecting a clock phase deviation on the basis of the level change of the specific pattern code sampled at a delayed clock of the phase adjusting circuit, a sweep signal generating circuit for generating a sweep signal of which phase deviation amount is in a range of 0to 360, a changeover circuit for issuing by selecting the sweep signal of the sweep signal generating circuit when the distribution is judged to be wide in the distribution width judging circuit, or selecting the clock phase deviation signal of the phase deviation detecting circuit when the distribution is judged to be narrow, and a control signal converting circuit for applying the output selected in the changeover circuit to the phase adjusting circuit as a phase control signal.

In the invention as set forth in claim 4 to 5, the phase deviation detecting circuit comprises a pattern detecting circuit for receiving the reproduced digital signal from the A/D converter, supposing a code row symmetrical back and forth in the signal level at the turning point of timing t0 to be a specific pattern code, and detecting the specific pattern code, a comparator for comparing the symmetry of F(t0−) and F(t0+), where F(t0−) and F(t0+) are respectively signal levels of sampling the specific pattern code detected in the pattern detecting circuit by the delayed clock of the phase adjusting circuit positioned before and after the timing t0, and a summing circuit for summing the results of comparison by the comparator corresponding to the phase deviation direction of the reproduced clock.

In the invention as set forth in claim 6, the decoder carries out Viterbi decoding.

In the invention as set forth in claim 7, the reproducing and equalizing circuit has the partial response characteristic characterized by PR (1, 0, −1).

In the invention as set forth in claim 8, the digital reproduced signal of the A/D converter is a signal corresponding to a ternary signal of levels (−1, 0, 1), the specific pattern code detected by the pattern detecting circuit is a code row of which four consecutive signal levels correspond to at least one of (0, 1, 1, 0) and (0, −1, −1, 0), and the comparator compares the second and third signal levels out of the four signal levels.

In the invention as set forth in claim 9, the digital reproduced signal of the A/D converter is a signal corresponding to a ternary signal of levels (−1, 0, 1), the specific pattern code detected by the pattern detecting circuit is a code row of which two consecutive signal levels correspond to at least one of (1, 1) and (−1, −1), and the comparator compares the two signal levels.

In the invention as set forth in claim 10, the distribution width judging circuit judges by the ratio of the level of the reproduced digital signal issued from the A/D converter existing within a specific level range.

In the invention as set forth in claim 11, the specific pattern code is intermittently recorded in a recording region of the recording medium.

In the invention as set forth in claim 12, phase control signal generating circuit, if there is a discontinuous portion in the recording area of the recording medium, does not change the level of the phase control signal in a specific period including the discontinuous portion.

In the invention as set forth in claim 13, the phase control signal generating circuit holds the level of the phase control signal in normal reproduction during variable speed reproduction of the recording medium.

According to such constitution, by reproducing the clock that is pulled in faster than the reproduced and equalized signal, and shifting the phase of such reproduced clock on the basis of the result of phase deviation detection by the reproduced digital signal, it is automatically adjusted so that the detection timing may always come to the eye center, so that a favorable data error rate may be always obtained stably.

In particular, according to the constitution of claim 3, when digital reproduced signal out of the A/D converter is wide in distribution as compared with the multi-difference-level, that is, when the clock phase is not within the eye opening in eye-patterns, the clock phase is swept until getting into the eye opening. When the distribution is narrow, that is, when the clock phase is within the eye opening in eye-patterns, the clock phase deviation is detected from the digital reproduced signal, and it is controlled so that the clock phase may come to the eye center, and thereby the clock phase is always positioned in the eye center and a favorable data error rate is obtained.

DESCRIPTION OF THE PREFERRED EMBODIMENTS

Embodiment 1

Figure 3:
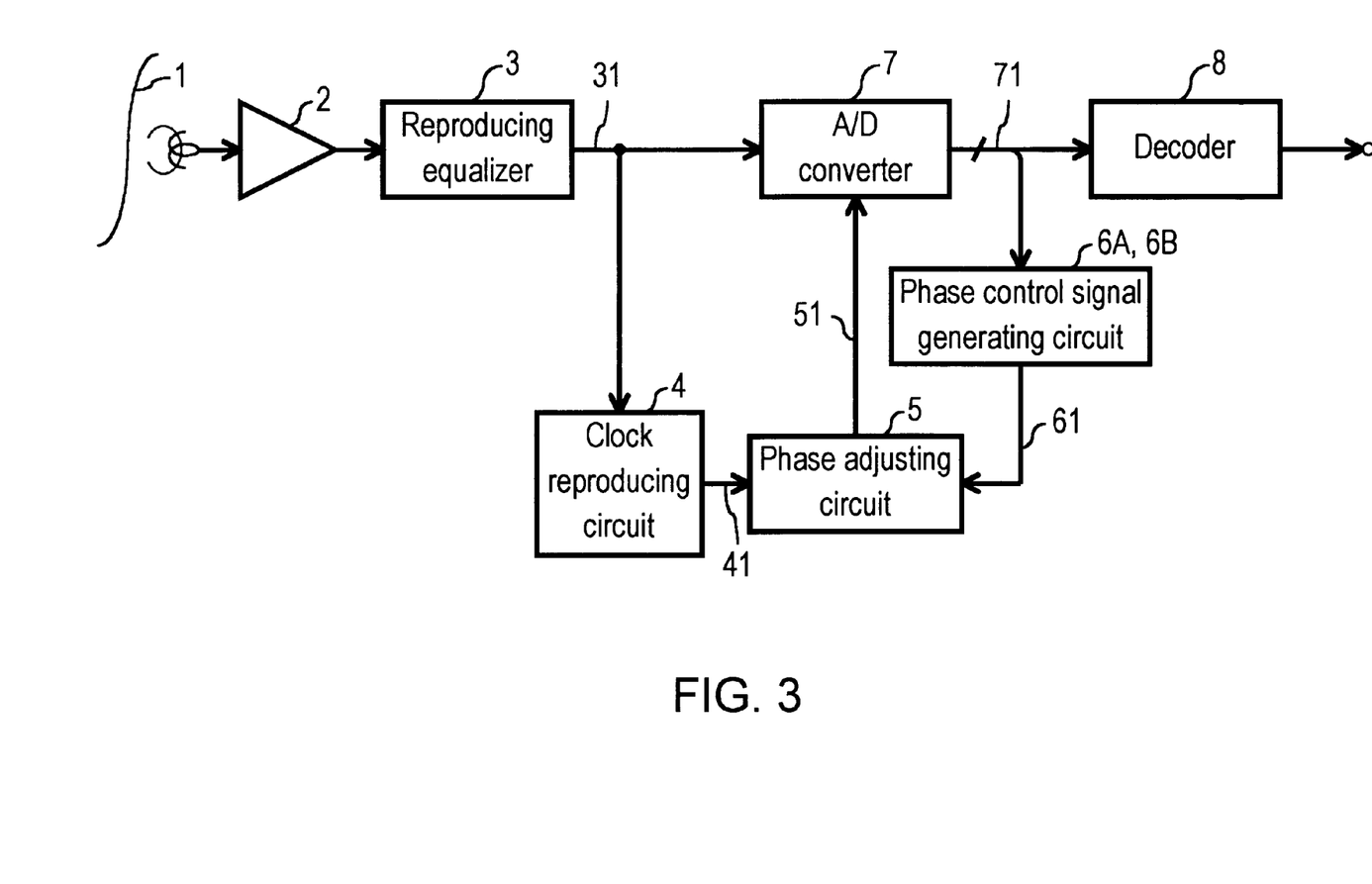
FIG. 3 is a block diagram showing a constitution of a data decoding apparatus in first and second embodiments of the invention.

A data decoding apparatus in a first embodiment of the invention is described below by referring to the drawings. FIG. 3 is a block diagram showing an entire constitution of the data decoding apparatus in the embodiment. Digital data is recorded in a magnetic tape 1. The reproduced signal reproduced from this magnetic tape 1 is fed into a reproducing equalizer 3 through a head amplifier 2. The reproducing equalizer 3 equalizes the reproduced signal so as to have a characteristic of PR (1, 0, −1). The reproducing equalizer 3 can be composed of a transversal filter with about five to ten taps. The reproduced and equalized signal 31 issued from the reproducing equalizer 3 is put into a clock reproducing circuit 4, and a reproduced clock 41 showing the detection timing is produced.

The reproduced clock 41 is fed into a phase adjusting circuit 5, and a delayed clock 51 delayed by the portion of the phase corresponding to the level of a phase control signal 61 from a phase control signal generating circuit 6A is issued from the phase adjusting circuit 5.

Figure 4A:
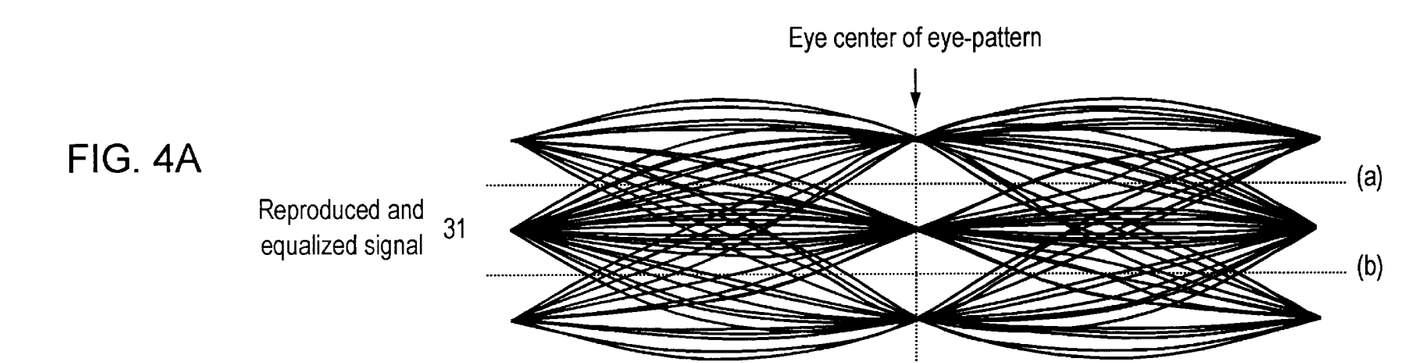
FIGS. 4A and 4B show an eye-pattern in PR (1, 0, −1).
Figure 4B:
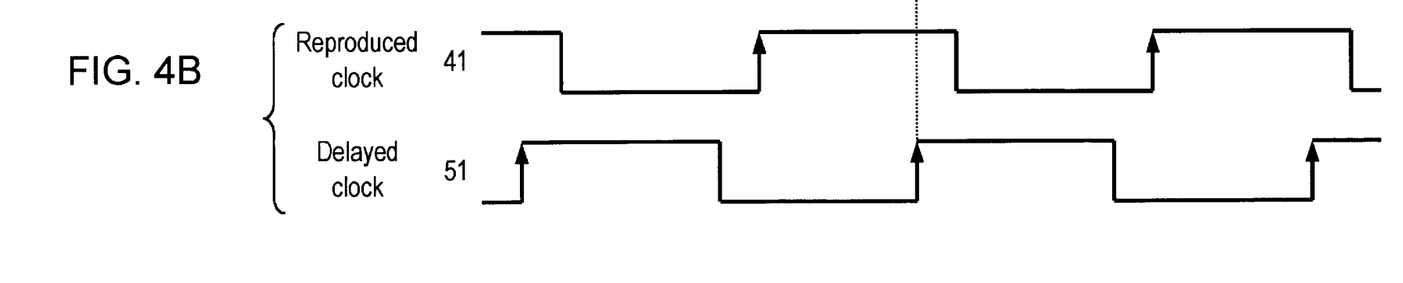

FIG. 4A is a waveform diagram of the reproduced and equalized signal 31, and FIG. 4B is a waveform diagram showing the phase relation of the reproduced clock 41 and delayed clock 51. The clock reproducing circuit 4 in FIG. 3 is composed by including a phased lock loop (PLL) circuit. This PLL circuit controls the reproduced clock 41 so that the crossing phase of the reproduced and equalized signal 31 with the threshold level (0.5) indicated by broken lines (a), (b) in FIG. 4A may coincide with the phase of the reproduced clock from the internal oscillator. Since the reproduced and equalized signal 31 is a signal crossing the threshold level (0.5) in the average of 1 to 2 bit intervals, the clock can be reproduced at high speed. When the reproduced and equalized signal 31 is observed in synchronism with the reproduced clock 41, an eye-pattern as shown in FIG. 4A is obtained.

The delayed clock 51 is delivered in a phase matched with the timing of the A/D conversion in the eye center shown in FIG. 4. The phase adjusting circuit 5 can be composed of a delay line capable of controlling the delay amount.

On the other hand, the reproduced and equalized signal 31 issued from the reproducing equalizer 3 is also fed into the A/D converter 7. The reproduced and equalized signal 31 is A/D converted at the timing of the delayed clock 51. The reproduced digital signal 71 issued from the A/D converter 7 is fed in the phase control signal generating circuit 6A and the decoder 8. The phase control signal generating circuit 6A is a circuit for detecting the clock phase deviation on the basis of the level change of the reproduced digital signal issued from the A/D converter 7, and issuing a phase control signal 61 for decreasing the clock phase deviation into the phase adjusting circuit 5. More specifically, the phase control signal 61 is generated for controlling the phase of the delayed clock 51 so that the A/D conversion timing may be the eye center in FIG. 4.

Figure 5:
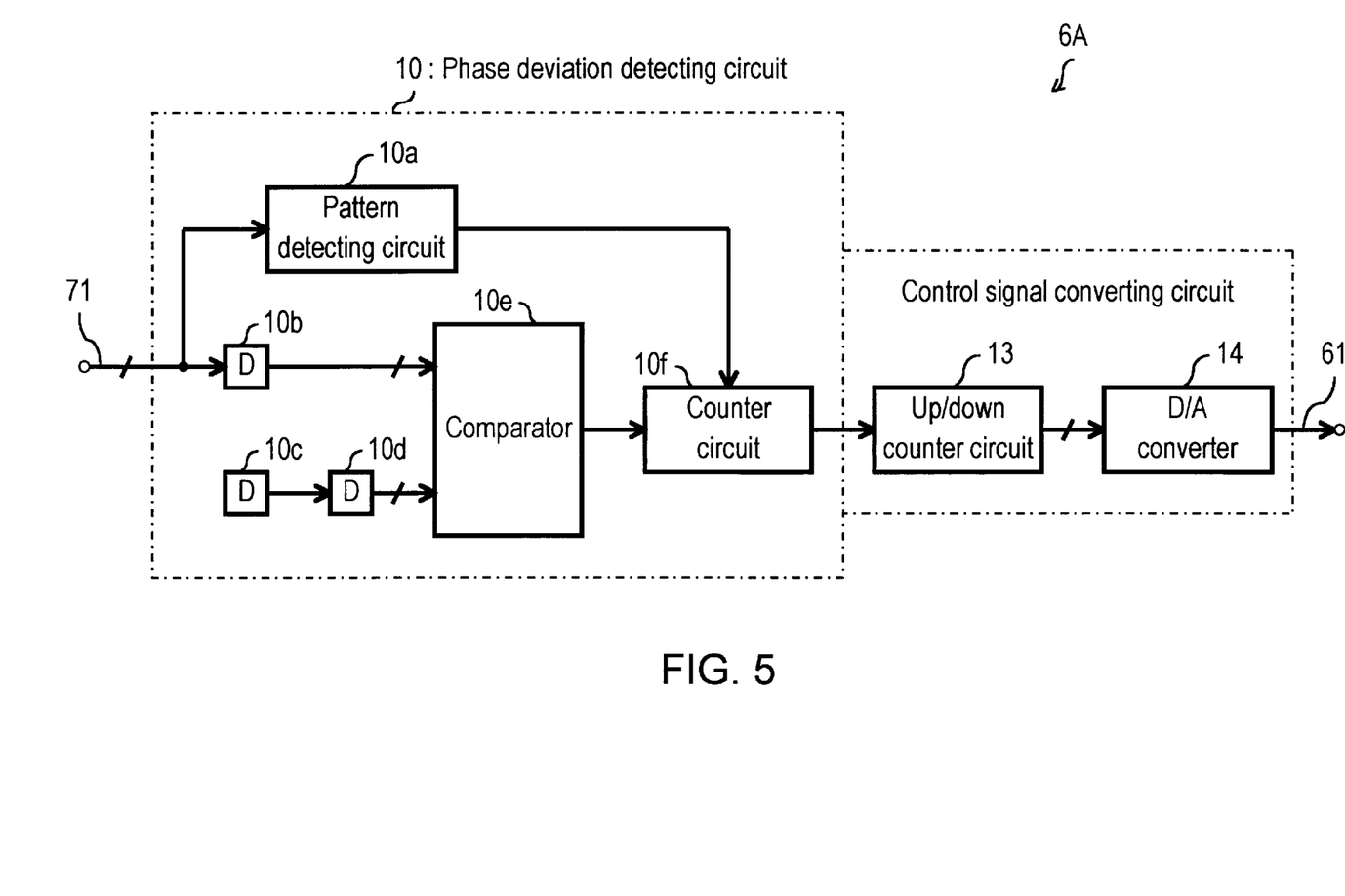
FIG. 5 is a block diagram showing a constitution of a phase control signal generating circuit in the first embodiment.

A specific constitution of the phase control signal generating circuit 6A and its operation are described below. FIG. 5 is a block diagram showing a constitution of the phase control signal generating circuit 6A. In the diagram, a reproduced digital signal 71 is fed into a phase deviation detecting circuit 10. The phase deviation detecting circuit 10 is composed of a pattern detecting circuit 10a, delay circuits 10b, 10c, 10d, a comparator 10e, and a counter circuit 10f. The phase deviation detecting circuit 10 is a circuit for extracting a code row symmetric back and forth in signal level at the turning point of a specific timing, as a specific pattern code, out of the reproduced digital signal of the A/D converter 7, and detecting a clock phase deviation on the basis of the level change of the specific pattern code sampled by the delayed clock of the phase adjusting circuit 5.

For example, a signal 0110 is symmetrical back and forth with respect to t0, where t0 is the middle time of signal 1 and 1. Thus, at a certain turning point of time t0, when the code row symmetrical back and forth in the signal level is the specific pattern code, the pattern detecting circuit 10a is a circuit for receiving the reproduced digital signal of the A/D converter 7 and detecting the specific pattern code. The delay circuits 10b, 10c, 10d are individually composed of one-bit delay element. A reproduced digital signal delayed by one bit through the delay circuit 10b and a reproduced digital signal delayed by two bits through the delay circuits 10c, 10d are given to the comparator 10e.

The comparator 10e is a circuit for compare the symmetricity of F(t0−) and F(t0+), where F(t0−) and F(t0+) are signal levels obtained by sampling the specific pattern code detected by the pattern detecting circuit 10a, by the delayed clock of the phase adjusting circuit 5 positioned before and after the timing t0.

Figure 7A:
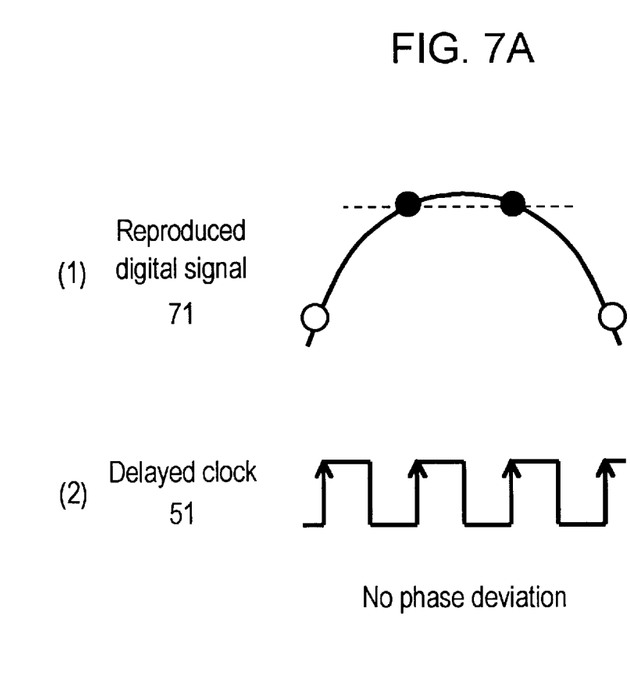
FIGS. 7A–7C show an explanatory diagram showing the relation of deviation of reproduced digital signal and detection timing, in the phase control signal generating circuit in the first embodiment.
Figure 7B:
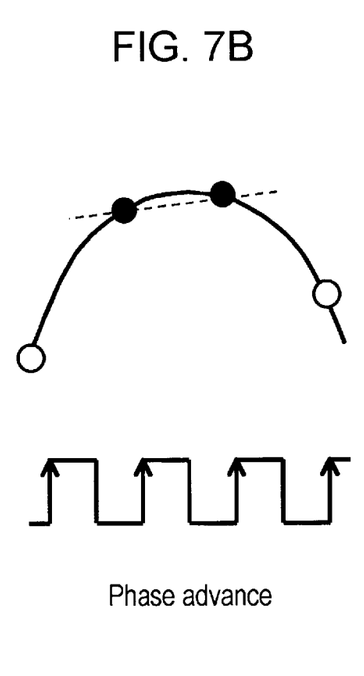
Figure 7C:
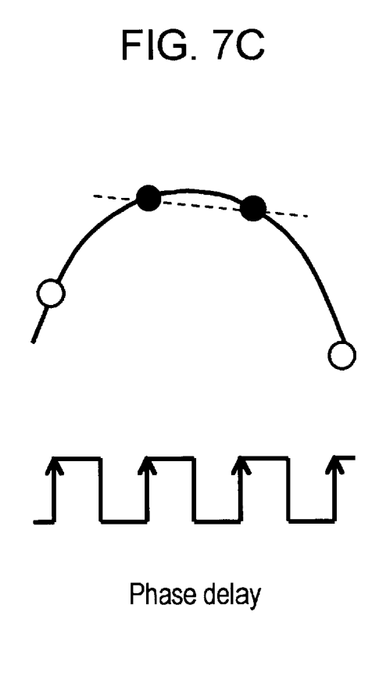

In the phase deviation detecting circuit 10, first in the pattern detecting circuit 10a, when (0, +1, +1, 0) or (0, −1, −1, 0) is detected as specific pattern of the ternary signal pattern, the phase deviation amount is detected. FIG. 7 is an explanatory diagram showing the relation between the detection timing and the distribution of the reproduced and equalized signal in the eye-pattern. Considering the case of pattern (0, +1, +1, 0), when the reproduced digital signal is detected at the timing of broken line (c) in FIG. 6, the detection timing is the eye center, and the amplitude of the reproduced digital signal fed into the comparator 10e is as indicated by a circle in FIG. 7A. When the detection timing is early as in broken line (b) in FIG. 6, the amplitude of the reproduced digital signal fed into the comparator 10e is as indicated by a circle in FIG. 7B. Furthermore, when the detection timing is late as in broken line (d) in FIG. 6, the amplitude of the reproduced digital signal fed into the comparator 10e is as indicated by a circle in FIG. 7C.

When the detection timing shown in FIG. 7A is the eye center, the second and third signal levels indicated by bullets in the pattern are identical. By contrast, when the detection timing is early, the third signal level is larger as shown in FIG. 7B, and when the detection timing is late, the second signal level is larger as shown in FIG. 7C. Hence, by comparing the second signal level issued through the delay circuit 10d and the third signal level issued through the delay circuit 10b by the comparator 10e, advance or delay of the detection timing can be detected.

Since noise is included in the reproduced digital signal 71, the result of each comparison fluctuates. Hence, the counter circuit 10f has a function as a summing circuit for summing the results of the comparison by the comparator 10e corresponding to the phase deviation detection of the reproduced clock. Specifically, the level comparison results issued from the comparator 10e for a specific period are accumulated, and the phase advance or delay is detected by the majority processing of the results of comparison.

In the case of the pattern (0, −1, −1, 0), the phase deviation is detected in the similar method. In the case of PR (1, 0, −1), of ternary levels, since +1 and −1 do not occur continuously three times or more, only by detecting the patterns (+1,+1) and (−1, −1), and comparing two signal levels, the phase deviation can be detected. The detection result of phase deviation is put into an up/down counter circuit 13 in FIG. 5, and the level of the phase control signal 61 is changed by one step in the phase deviation decreasing direction.

The digital control signal issued from the up-down counter circuit 13 is converted into an analog control signal by a D/A converter 14. As a result, the reproduced digital signal 71 in FIG. 3 is an A/D converted signal always stably at the timing of the eye center. Herein, the up/down counter circuit 13 and D/A converter 14 have the function of control signal converting circuit for issuing a phase control signal to the phase adjusting circuit 5 so as to decrease the phase deviation detected by the phase deviation detecting circuit 10.

The reproduced digital signal 71 is fed into the decoder 8, and decoded data is issued after Viterbi decoding. Viterbi decoding is not to identify the data in every bit, but to decode into a bit row corresponding to the most probable path (showing the status transition) by the index of the Euclidean distance between the reproduced signal point and each reference point. The detail of Viterbi decoding principle and constitution of Viterbi decoder is mentioned in the cited reference (Eto, Mita, Doi: Digital video recording technology, Nikkan Kogyo Shimbunsha, pp. 72–84).

Thus by conducting separately the high speed clock reproduction, and the low speed clock phase adjustment on the basis of the reproduced digital signal level, more specifically, comparison of two levels in the specific pattern, without requiring redundant recorded data, it is possible to obtain always stable favorable signal error rate by high speed clock pull-in in the signal discontinuous portion, and stable clock phase adjustment in the eye center.

Embodiment 2

Figure 8:
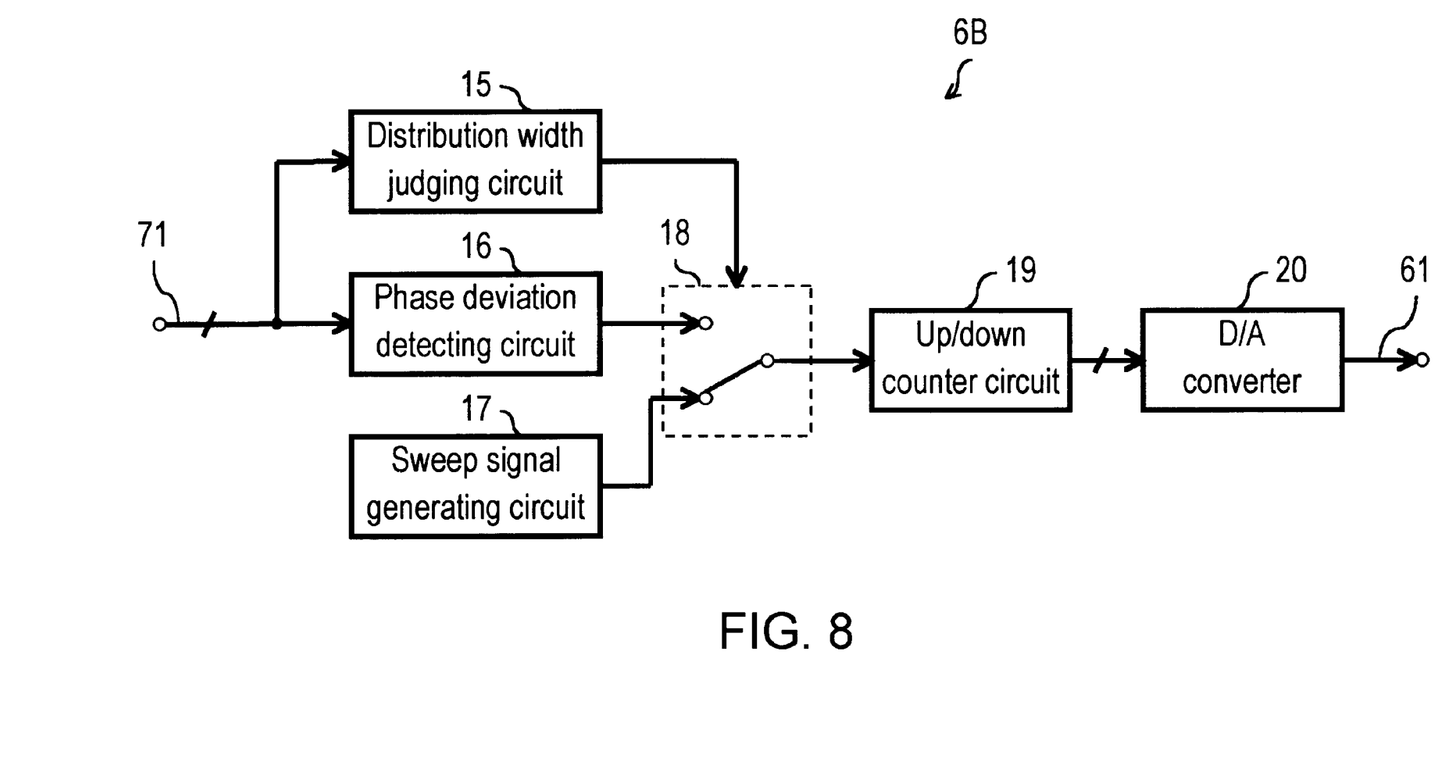
FIG. 8 is a block diagram showing a constitution of a phase control signal generating circuit in the second embodiment.

A data decoding apparatus in a second embodiment of the invention is described by referring to the drawings. The entire constitution of the data decoding apparatus of the embodiment is same as in FIG. 3, except that only the phase control signal generating circuit is different from that in the first embodiment. FIG. 8 is a structural diagram of a phase control signal generating circuit 6B in this embodiment. The phase control signal generating circuit 6B is composed of a distribution width judging circuit 15, a phase deviation detecting circuit 16, a sweep signal generating circuit 17, a changeover switch 18, an up/down counter circuit 19, and a D/A converter 20.

The distribution width judging circuit 15 is a circuit for calculating the distribution of the digital reproduced signal level issued from the A/D converter 7 from the reference signal level, and judging the width of distribution of the level. That is, the signal level of the reproduced digital signal 71 is detected plural times, and the width of distribution is judged by the ratio of the level existing in the specific level range. The phase deviation detecting circuit 16 is a same circuit as the phase deviation detecting circuit 10 shown in FIG. 5. The sweep signal generating circuit 17 is a circuit for generating a sweep signal in a phase deviation range of 0 to 360.

The changeover switch 18 is a changeover circuit for selecting the sweep signal of the sweep signal generating circuit 17 when the distribution is judged to be wide by the distribution width judging circuit 15, and selecting the phase deviation signal of the phase deviation detecting circuit 16 when the distribution is judged to be narrow. The up/down counter circuit 19 for receiving the output of the changeover switch 18, and the D/A converter 20 for converting the output of the up/down counter circuit 19 into an analog signal are same as in FIG. 5.

In thus constituted phase control signal generating circuit 6B, the operation is described below. A reproduced digital signal 71 is fed into the distribution width judging circuit 15, and it is measured how far the reproduced digital signal 71 is distributed from the ternary reference level (+1, 0, –1). By judging whether the distribution is wider than the specified value or not, the judging result is issued.

When the detection timing of the delayed clock 51 is out of the eye opening as indicated by broken line (a) in FIG. 6, the distribution of the signal level of the sampling points is wide, and hence "distribution: wide" is issued. By contract, when settling within the eye opening as indicated by broken lines (b), (c), (d) in FIG. 6, the distribution is narrow, and hence "distribution: narrow" is issued. In the case of "distribution: narrow," the changeover switch 18 is changed over to the phase deviation detecting circuit 16. When the phase deviation detecting circuit 16 detects that the phase is advanced, the phase control signal generating circuit 6B changes the level of the phase control signal 61 and issues so as to delay the phase through the up/down counter circuit 19 and D/A converter 20. If the phase deviation detecting circuit 16 detects that the phase is delayed, the phase control signal generating circuit 6B changes the level of the phase control signal 61 and issues so as to advance the phase through the up/down counter circuit 19 and D/A converter 20.

Figure 9:
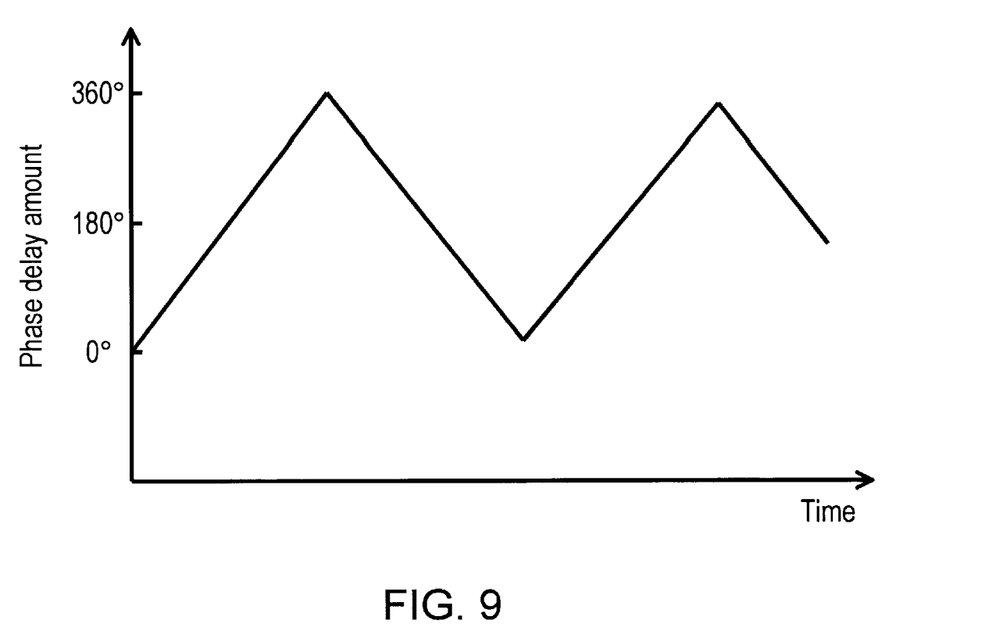
FIG. 9 is a waveform diagram of sweep signal used in the phase control signal generating circuit in the second embodiment.

In the case of "distribution: wide," the changeover switch 18 is changed over to the sweep signal generating circuit 17. In the phase deviation detecting circuit 16, since the phase deviation cannot be detected, the phase control signal 61 for sweeping the entire range of phase control as shown in FIG. 9 is issued until the detection timing settles within the eye opening. In the midst of phase sweeping, when the detection timing settles within the eye opening, "distribution: narrow" is judged. Once the delayed clock 51 settles in the eye opening, the level of the phase control signal 61 is controlled by the operation of the phase deviation detecting circuit 16. Accordingly, regardless of the initial phase of the delayed clock 51, it is automatically adjusted always at the timing in the eye center.

Thus, when the distribution of the reproduced digital signal 71 as seen from the delayed clock 51 is wide, by sweeping the clock phase, the clock phase is shifted to the opening of the eye-pattern. Consequently, by finely adjusting the phase of the eye center on the basis of the level of the reproduced digital signal, the clock phase can be quickly pulled into the eye center from any initial phase. In this way, the signal of low error rate may be obtained always stably.

Figure 10:
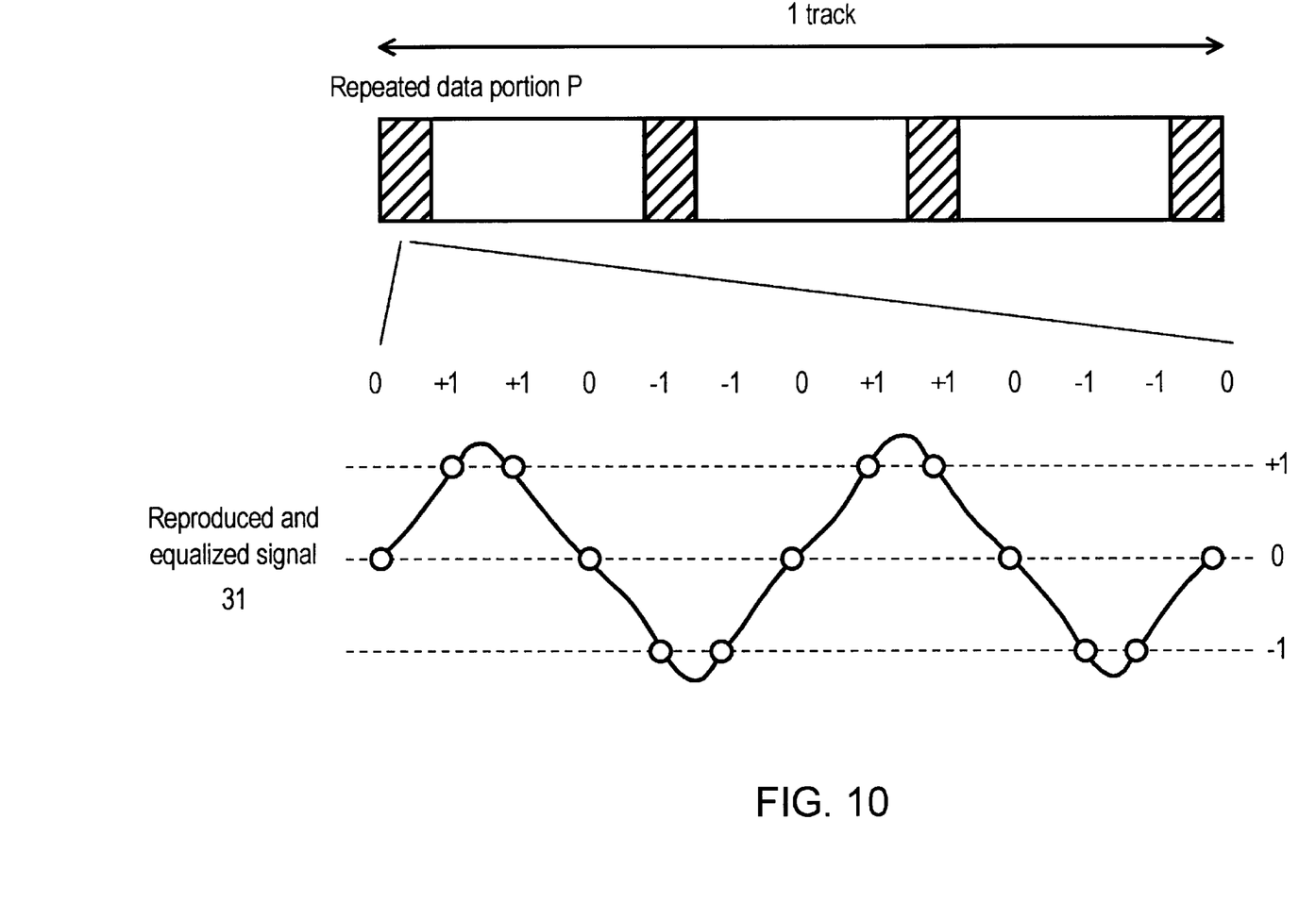
FIG. 10 is a schematic diagram of a repeated data section in which a specific pattern is inserted.

When the recorded data row is random, the probability of occurrence of ternary signal pattern (0, +1, +1, 0) or (0, –1, –1, 0) is 1/32, and the probability of occurrence of ternary signal pattern (+1, +1) or (–1, –1) is 1/8. Depending on the frequency of occurrence of signal of this pattern, the response time for pulling in the clock phase into the eye center of the eye pattern is determined. Hence, to quicken the response time, repeated data portions containing many specific pattern signals mentioned above are inserted intermittently. The data row containing such data portions should be recorded in the recording medium. For example, as shown in FIG. 10, a repeated data portion P of 0, +1, +1, 0, –1, –1, . . . may be inserted into a specific position in one track as reproduced and equalized signal.

In the case that the recording medium is a magnetic tape, in a specific period containing a discontinuous portion of reproduced signal, for example, at the time of head changeover when reproducing the magnetic tape, the operation of the phase deviation detecting circuits 10, 16 is stopped. At the same time, by holding the level of the phase control signal 61, adverse effects in the discontinuous portion in the recorded region can be avoided. By a similar reason, in variable speed reproduction, the level of the phase control signal 61 in normal reproduction should be held.

In the first and second embodiments, the magnetic tape is used as the recording medium, but same effects are obtained when the magnetic disk or optical disk is used instead of the magnetic tape.

Thus, according to the invention, by separately carrying out the high speed clock reproduction and low speed clock phase adjustment on the basis of reproduced digital signal level, high speed clock pull-in and stable pull-in into the eye center are realized in the signal discontinuous portion, without requiring redundant recorded data. By such clock phase adjustment, data of low error rate is obtained always stably.

In particular, in the invention as set forth in claim 3, if the distribution of reproduced digital signal is wide, by sweeping the clock phase, the clock phase can be shifted to the opening of the eye-pattern and the phase can be adjusted to the eye center on the basis of the level of the reproduced digital signal. As a result, the clock phase can be pulled into the eye center from any initial phase, so that data of low error rate may be obtained always stably.

What is claimed:

1. A data decoding apparatus comprising:

a reproducing and equalizing circuit for converting a reproduced signal from a recording medium into a reproduced and equalized signal by equalizing according to partial response characteristic, a clock reproducing circuit for issuing a reproduced clock synchronized with the timing of data identification from the reproduced and equalized signal of said reproducing and equalizing circuit, a phase adjusting circuit for shifting the phase of the reproduced clock of said clock reproducing circuit depending on a phase control signal, and issuing it as a delayed clock, an A/D converter for sampling said reproduced and equalized signal by the delayed clock of said phase adjusting circuit and converting into a reproduced digital signal, a phase control signal generating circuit for sampling a pattern from the reproduced digital signal issued form said A/D converter to detect clock phase deviation of the delayed clock, and issuing a phase control signal for decreasing said clock phase deviation against said phase adjusting circuit, and a decoder for decoding the reproduced digital signal of said A/D converter into data.

2. A data decoding apparatus of claim 1, wherein said phase control signal generating circuit comprises a phase deviation detecting circuit for extracting a code row symmetric back and forth in signal level at the turning point of a specific timing, as a specific pattern code, out of the reproduced digital signal of said A/D converter, and detecting a clock phase deviation on the basis of the level change of said specific pattern code, and a control signal converting circuit for issuing a phase control signal to said phase adjusting circuit so as to decrease the phase deviation detected in said phase deviation detecting circuit.

3. A data decoding apparatus of claim 1, wherein said phase control signal generating circuit comprises a distribution width judging circuit for calculating the distribution of the digital reproduced signal issued from said A/D converter from the reference signal level, and judging whether the level distribution is narrow or wide, a phase deviation detecting circuit for extracting a code row partially changing in signal level in a sinusoidal wave profile as a specific pattern code, out of the reproduced digital signal from said A/D converter, and detecting a clock phase deviation on the basis of the level change of said specific pattern code sampled at a delayed clock of said phase adjusting circuit, a sweep signal generating circuit for generating a sweep signal of which phase deviation amount is in a range of 0 to 360, a changeover circuit for issuing by selecting the sweep signal of said sweep signal generating circuit when the distribution is judged to be wide in said distribution width judging circuit, or selecting the clock phase deviation signal of said phase deviation detecting circuit when the distribution is judged to be narrow, and a control signal converting circuit for applying the output selected in said changeover circuit to said phase adjusting circuit as a phase control signal.

4. A data decoding apparatus of claim 2, wherein said phase deviation detecting circuit comprises a pattern detecting circuit for receiving the reproduced digital signal from the A/D converter, supposing a code row symmetrical back and forth in the signal level at the turning point of timing t0 to be a specific pattern code, and detecting said specific pattern code, a comparator for comparing the symmetricity of F(t0−) and F(t0+), where F(t0−) and F(t0+) are respectively signal levels of sampling the specific pattern code detected in said pattern detecting circuit by the delayed clock of the phase adjusting circuit positioned before and after said timing t0, and a summing circuit for summing the results of comparison by said comparator corresponding to the phase deviation direction of said reproduced clock.

5. A data decoding apparatus of claim 3, wherein said phase deviation detecting circuit comprises a pattern detecting circuit for receiving the reproduced digital signal from the A/D converter, supposing a code row symmetrical back and forth in the signal level at the turning point of timing t0 to be a specific pattern code, and detecting said specific pattern code, a comparator for comparing the symmetricity of F(t0−) and F(t0+), where F(t0−) and F(t0+) are respectively signal levels of sampling the specific pattern code detected in said pattern detecting circuit by the delayed clock of the phase adjusting circuit positioned before and after said timing t0, and a summing circuit for summing the results of comparison by said comparator corresponding to the phase deviation direction of said reproduced clock.

6. A data decoding apparatus of claim 1, wherein said decoder carries out Viterbi decoding.

7. A data decoding apparatus of claim 1, wherein said reproducing and equalizing circuit has the partial response characteristic characterized by PR (1, 0, −1).

8. A data decoding apparatus of claim 1, wherein the digital reproduced signal of said A/D converter is a signal corresponding to a ternary signal of levels (−1, 0, 1), the specific pattern code detected by said pattern detecting circuit is a code row of which four consecutive signal levels correspond to at least one of (0, 1, 1, 0) and (0, −1, −1, 0), and said comparator compares the second and third signal levels out of the four signal levels.

9. A data decoding apparatus of claim 1, wherein the digital reproduced signal of said A/D converter is a signal corresponding to a ternary signal of levels (−1, 0, 1), the specific pattern code detected by said pattern detecting circuit is a code row of which two consecutive signal levels correspond to at least one of (1, 1) and (−1, −1), and said comparator compares the two signal levels.

10. A data decoding apparatus of claim 3, wherein said distribution width judging circuit judges by the ratio of the level of the reproduced digital signal issued from the A/D converter existing within a specific level range.

11. A data decoding apparatus of claim 2, wherein said specific pattern code is intermittently recorded in a recording region of said recording medium.

12. A data decoding apparatus of claim 2, wherein said phase control signal generating circuit, if there is a discontinuous portion in the recording area of said recording medium, does not change the level of said phase control signal in a specific period including said discontinuous portion.

13. A data decoding apparatus of claim 2, wherein said phase control signal generating circuit holds the level of the phase control signal in normal reproduction during variable speed reproduction of said recording medium.

14. A data decoding apparatus of claim 2, wherein said decoder carries out Viterbi decoding.

15. A data decoding apparatus of claim 3, wherein said decoder carries out Viterbi decoding.

16. A data decoding apparatus of claim 4, wherein said decoder carries out Viterbi decoding.

17. A data decoding apparatus of claim 5, wherein said decoder carries out Viterbi decoding.

18. A data decoding apparatus of claim 2, wherein the digital reproduced signal of said A/D converter is a signal corresponding to a ternary signal of levels (−1, 0, 1), the specific pattern code detected by said pattern detecting circuit is a code row of which four consecutive signal levels correspond to at least one of (0, 1, 1, 0) and (0, −1, −1, 0), and said comparator compares the second and third signal levels out of the four signal levels.

19. A data decoding apparatus of claim 3, wherein the digital reproduced signal of said A/D converter is a signal corresponding to a ternary signal of levels (−1, 0, 1,) the specific pattern code detected by said pattern detecting circuit is a code row of which four consecutive signal levels correspond to at least one of (0, 1, 1, 0) and (0, −1, −1, 0), and said comparator compares the second and third signal levels out of the four signal levels.

20. A data decoding apparatus of claim 4, wherein the digital reproduced signal of said A/D converter is a signal corresponding to a ternary signal of levels (−1, 0, 1), the specific pattern code detected by said pattern detecting circuit is a code row of which four consecutive signal levels correspond to at least one of (0, 1, 1, 0) and (0, −1, −1, 0), and said comparator compares the second and third signal levels out of the four signal levels.

21. A data decoding apparatus of claim 5, wherein the digital reproduced signal of said A/D converter is a signal corresponding to a ternary signal of levels (−1, 0, 1), the specific pattern code detected by said pattern detecting circuit is a code row of which four consecutive signal levels correspond to at least one of (0, 1, 1, 0) and (0, −1, −1, 0), and said comparator compares the second and third signal levels out of the four signal levels.

22. A data decoding apparatus of claim 2, wherein the digital reproduced signal of said A/D converter is a signal corresponding to a ternary signal of levels (−1, 0, 1), the specific pattern code detected by said pattern detecting circuit is a code row of which two consecutive signal levels correspond to at least one of (1, 1) and (−1, −1), and said comparator compares the two signal levels.

23. A data decoding apparatus of claim 3, wherein the digital reproduced signal of said A/D converter is a signal corresponding to a ternary signal of levels (−1, 0, 1), the specific pattern code detected by said pattern detecting circuit is a code row of which two consecutive signal levels correspond to at least one of (1, 1) and (−1, −1), and said comparator compares the two signal levels.

24. A data decoding apparatus of claim 4, wherein the digital reproduced signal of said A/D converter is a signal corresponding to a ternary signal of levels (−1, 0, 1), the specific pattern code detected by said pattern detecting circuit is a code row of which two consecutive signal levels correspond to at least one of (1, 1) and (−1, −1), and said comparator compares the two signal levels.

25. A data decoding apparatus of claim 5, wherein the digital reproduced signal of said A/D converter is a signal corresponding to a ternary signal of levels (−1, 0, 1), the specific pattern code detected by said pattern detecting circuit is a code row of which two consecutive signal levels correspond to at least one of (1, 1) and (−1, −1), and said comparator compares the two signal levels.

26. A data decoding apparatus of claim 3, wherein said specific pattern code is intermittently recorded in a recording region of said recording medium.

27. A data decoding apparatus of claim 4, wherein said specific pattern code is intermittently recorded in a recording region of said recording medium.

28. A data decoding apparatus of claim 5, wherein said specific pattern code is intermittently recorded in a recording region of said recording medium.

29. A data decoding apparatus of claim 3, wherein said phase control signal generating circuit, if there is a discontinuous portion in the recording area of said recording medium, does not change the level of said phase control signal in a specific period including said discontinuous portion.

30. A data decoding apparatus of claim 3, wherein said phase control signal generating circuit holds the level of the phase control signal in normal reproduction during variable speed reproduction of said recording medium.

31. A data decoding apparatus according to claim 1, wherein said pattern which is sampled is compared with a predetermined pattern in order to detect clock phase deviation of the delayed clock.

* * * * *

UNITED STATES PATENT AND TRADE MARK OFFICE
CERTIFICATE OF CORRECTION

PATENT NO. : 6,005,507
DATED : December 21, 1999
INVENTOR(S) : Nakatsu et al.

It is certified that error appears in the above-identified patent and that said Letters Patent is hereby corrected as shown below:

Column 9, line 25, "form" should read --from--.

Signed and Sealed this

Twenty-seventh Day of March, 2001

Attest:

NICHOLAS P. GODICI

Attesting Officer

Acting Director of the United States Patent and Trademark Office